United States Patent Office 2,699,751
Patented Jan. 18, 1955

2,699,751

DECOYING MIGRATING SALMON TO DESIRED LOCATIONS BY ARTIFICIAL ODORS

Arthur D. Hasler, Madison, and Warren J. Wisby, Eagle Heights, Madison, Wis., assignors, by mesne assignments, to the United States of America as represented by the Secretary of the Navy No Drawing. Application August 18, 1952, Serial No. 305,086

6 Claims. (Cl. 119—3)

This invention relates to a method of decoying fish and the like to a desired area; more specifically, the invention relates to a method for decoying fish, particularly, salmon, to a designated area during spawning by means of conditioning young salmon to an odor.

There are numerous instances where it is desirable to direct fish to a designated area. It may be necessary, for example, to divert fish from a given area where they are interfering with sonar (sound) contact between a ship and a desired water-immersed target.

Another instance where this result is desired is in the salmon industry where the existing spawning ground location becomes undesirable due to pollution, power dams, or diversion of water for irrigation. The salmon industry, for example, has been greatly damaged by the building of dams at locations down stream of the salmon's spawning grounds since the salmon often kill themselves in an attempt to reach their regular spawning grounds.

One object of the invention is, therefore, to provide a novel method for diverting fish or animals, whose migrating habits are determined by the olfactory sense thereof, from one area to another.

Another object of the invention is to provide an effective method of attracting preconditioned fish to a given area by acting upon the olfactory sense of the fish.

A further object of the invention is in providing a method by which preconditioned salmon in particular may be decoyed to a more desirable spawning ground.

These and other objects will become more apparent upon making reference to the specification to follow.

The role of the sensory mechanisms in the orientation of fish, especially in relation to homing, has been a mystery for many years. The primitive character of the sense of smell, its evolutionary constancy, its extreme sensitivity in comparison to other receptor processes, and its capacity to serve as a memory-evoking mechanism point to the conclusion that olfactory stimuli have a marked effect on the homing of migrating fish.

This conclusion has been proven by a series of experiments by which fish were conditioned to water from two separate streams. When a sample of water from one stream was admitted into the aquarium, the fish (bluntnose minnows) were punished by giving them a small electric shock, while when presented with a sample of water from another stream, the fish were fed. After this conditioning was continued for a while, it was noted that the fish avoided the stream sample with which punishment was administered and swam towards the other stream sample, where they were fed. To prove that this action was due to the ability of the fish to smell the stream sample differences, the olfactory capsules of the conditioned fish were destroyed by heat cautery whereupon fish were not able to distinguish between the stream samples.

It was discovered by performing the same experiment as above with the residue and the distillate of the streams separately utilized in distilled water that the distillate of the stream contained the odor-producing chemical. It was concluded from further experiments that the odor-producing compounds were organic components volatile or destroyed at 100° C. at atmospheric pressure. The compounds derived from the vegetation and soils of the water shed lend a distinctive odor which can be perceived, learned, and recognized again after a protracted period of nonexposure. In experiments performed to test the length of time the fish retain the learning due to its conditioning with the stream samples above mentioned, it was found that the conditioning lasted the longest period where the fish conditioned were the youngest.

Results from experiments indicate that the olfactory system of salmon is very acute, and that they accordingly can discriminate between the stream odors.

Salmon spawn generally in fresh water streams. The young salmon hatched in the fresh water usually make their way to the salt water only to return to their home streams several years later, so that it appears that the salmon are able to remember the odor of the parent or home streams for many years.

One method of diverting salmon from their home spawning grounds would be to utilize artificial odors emitted by particular chemicals toward which the salmon are particularly sensitive. A group of salmon fry could be conditioned to such an artificial order during hatchery rearing. The fish would remember the artificial odor, so that these conditioned fish, several years later, could be reoriented from their natural undesirable spawning grounds by decoying them to another location down stream by introducing the training odor into the desired stream location at the time of the return migration.

If such a method were continuously carried on year after year for several years, the spawning location of the salmon would be gradually changed from one location to another. It is obvious that the above method could not be workable in a single year, since the fish returning one year are not the fish which were reared the previous year. Also, it may not be possible to condition all of the fish fry at one time in a stream because of the size of the area involved and the numbers of different locations which are used by the salmon for spawning.

One chemical found exceptionally good as a training odor for salmon is morpholine. The odor emitted by this compound was found to be perceived in extremely small concentration by young salmon ($1 \times 10^{-5}$ mg./liter to $1 \times 10^{-6}$ mg./liter) and was not toxic and was not repellant in small concentrations.

Dicyclopentadiene is another chemical-training odorant found satisfactory, but it is not as satisfactory for field use as the latter compound.

It should be understood that the broader aspects of the invention are not limited to fish necessarily, since other animals perhaps could be so conditioned to a particular odor or other sensory stimuli in order to modify their locations.

Also, the natural as distinguished from artificial odors may, in certain instances, be satisfactorily utilized. For example, the distillate of samples of water from a particular fish's spawning ground could perhaps be transferred to a point down stream during a return migration and thereby prevent the fish from proceeding over treacherous waters to their natural habitat. If the stream distillate is used, care must be taken not to obtain the distillate by boiling at 100° C., since boiling may destroy the odor-producing chemical. In one experiment, distillation at 20° C. by means of lowering the pressure of the air about the water proved satisfactory.

In this case, the fish are already conditioned to a particular area, and samples of water or the distillate thereof from the normal spawning grounds are transferred to a point in the path of the return migration preceding the normal spawning location. The best procedure would depend upon whether the chemical to which the fish is naturally or normally conditioned can be obtained in sufficient quantities and concentrations to be effective when transferred to the new location.

Many other variations may be made without deviating from the broader aspects of the invention.

We claim:

1. A method of modifying the migratory habits of fish which are determined by the olfactory sense thereof comprising the steps of initially conditioning the fish when in the young fingerling state to an odor, and then interposing the same odor at the point along the path of migration of the fish so as to modify the migration course thereof and divert the fish to a new path.

2. The method of claim 1 characterized further by said odor being taken from the group consisting of dicyclopentadiene and morpholine.

3. A method of moving the spawning ground of fish to a different point along the return migration path thereof comprising the steps of placing an odorific chemical in the water during hatching and rearing to create an artificial olfactory stimulus which the fish will remember and be attracted to during a return migration for spawning, and then placing said odorific chemical at the point along the return migration path of the conditioned fish where it is desired the fish should spawn.

4. The method of claim 3 characterized further by said odorific chemical being a member of the group consisting of dicyclopentadiene and morpholine.

5. A method of moving the spawning ground of salmon to a different point along the return migration path thereof comprising the steps of placing an odorific chemical in the water during hatching and rearing to create an artificial olfactory stimulus which the salmon will remember and be attracted to during a return migration for spawning, and then placing said odorific chemical at the point along the return migration path of the conditioned salmon where it is desired to divert the salmon to a new spawning ground.

6. The combination of claim 5 characterized further by said odorific chemical being morpholine.

References Cited in the file of this patent

UNITED STATES PATENTS

| | | |
|---|---|---|
| 1,249,194 | Race | Dec. 4, 1917 |
| 1,787,908 | Inami | Jan. 6, 1931 |
| 2,091,457 | Sauer | Aug. 31, 1937 |
| 2,555,088 | Irwin | May 29, 1951 |
| 2,611,983 | Silva | Sept. 30, 1952 |